(12) United States Patent  
Pun et al.

(10) Patent No.: US 7,729,336 B2
(45) Date of Patent: Jun. 1, 2010

(54) SYNCHRONIZATION AND TIMING SOURCE PRIORITY IN AN AD-HOC NETWORK

(75) Inventors: Ngan-cheung Pun, Fairport, NY (US); David Clark, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 525 days.

(21) Appl. No.: 11/692,278

(22) Filed: Mar. 28, 2007

(65) Prior Publication Data

US 2008/0240073 A1  Oct. 2, 2008

(51) Int. Cl.
*H04J 3/06* (2006.01)
*H04B 7/21* (2006.01)

(52) U.S. Cl. ............... 370/350; 370/321; 370/329; 370/338; 370/331

(58) Field of Classification Search ......... 455/41.2, 455/445, 518; 370/390, 255; 375/200.57
See application file for complete search history.

(56) References Cited

U.S. PATENT DOCUMENTS

| | | | |
|---|---|---|---|
| 5,699,388 A | 12/1997 | Wang et al. | 375/356 |
| 5,812,547 A | 9/1998 | Benzimra et al. | 370/350 |
| 6,466,608 B1 | 10/2002 | Hong et al. | 375/137 |
| 6,538,600 B1 | 3/2003 | Richton et al. | 342/357.1 |
| 6,542,754 B1 | 4/2003 | Sayers et al. | 455/502 |
| 6,546,026 B1 | 4/2003 | Goeddel | 370/513 |
| 6,594,273 B1 | 7/2003 | McGibney | 370/442 |
| 6,622,022 B1 | 9/2003 | Du | 455/502 |

(Continued)

FOREIGN PATENT DOCUMENTS

WO  WO2006/056174  6/2006

(Continued)

OTHER PUBLICATIONS

De Oliveira et al., "Localization In Time And Space For Sensor Networks", Advanced Networking And Applications, 2007. AINA '07. 21st International Conference ON, IEEE, PI, May 1, 2007, pp. 539-554.

(Continued)

*Primary Examiner*—Kent Chang
*Assistant Examiner*—Farley Balan
(74) *Attorney, Agent, or Firm*—Allen, Dyer, Doppelt, Milbrath & Gilchrist, P.A.

(57) ABSTRACT

A bandwidth efficient and robust timing synchronization approach in an ad-hoc network is provided by a mobile ad-hoc network including at least one group of mobile nodes having at least one timing reference (TR) node. Mobile nodes include a controller and a wireless communications device cooperating therewith to generate and transmit timing synchronization beacons having a respective hop count indicating a number of hops to the at least one timing reference node, receive timing synchronization beacons from neighboring nodes, and synchronize node communication timing with neighboring nodes based upon the number of hops to the at least one timing reference node. The timing reference node may cooperate with the other mobile nodes based upon a timing source priority tree including levels defined by hop counts. The timing reference node is at a starting level of the timing source priority tree. The other nodes are at a higher level of the timing source priority tree than the starting level and correspond to the number of hops to the at least one timing reference node.

21 Claims, 4 Drawing Sheets

U.S. PATENT DOCUMENTS

| | | | |
|---|---|---|---|
| 6,751,248 B1 | 6/2004 | Tan | 375/132 |
| 6,785,253 B1 | 8/2004 | Du | 370/338 |
| 6,792,247 B2 | 9/2004 | Law et al. | 455/41.2 |
| 6,807,165 B2 | 10/2004 | Belcea | 370/347 |
| 7,027,773 B1* | 4/2006 | McMillin | 455/41.2 |
| 7,298,716 B2* | 11/2007 | Abraham et al. | 370/321 |
| 2004/0005902 A1 | 1/2004 | Belcea | 455/502 |
| 2004/0190487 A1 | 9/2004 | Biggs | 370/350 |
| 2005/0088980 A1* | 4/2005 | Olkkonen et al. | 370/255 |
| 2006/0167784 A1* | 7/2006 | Hoffberg | 705/37 |
| 2007/0008947 A1 | 1/2007 | Belcea | 370/350 |
| 2008/0253327 A1* | 10/2008 | Kohvakka et al. | 370/330 |
| 2008/0291855 A1* | 11/2008 | Bata et al. | 370/311 |
| 2009/0122783 A1* | 5/2009 | Tanaka et al. | 370/350 |

FOREIGN PATENT DOCUMENTS

WO    WO2006/067271    6/2006

OTHER PUBLICATIONS

Shang et al., "A Low Overhead Multi-Hop Time-Sync Protocol For Wireless Sensor Networks", Networking, Sensing And Control, 2005, Proceedings. 2005 IEEE Tucson, AZ, USA, Mar. 19-22, 2005, Piscataway, NJ, USA, IEEE, Mar. 19, 2005, pp. 54-59.

* cited by examiner

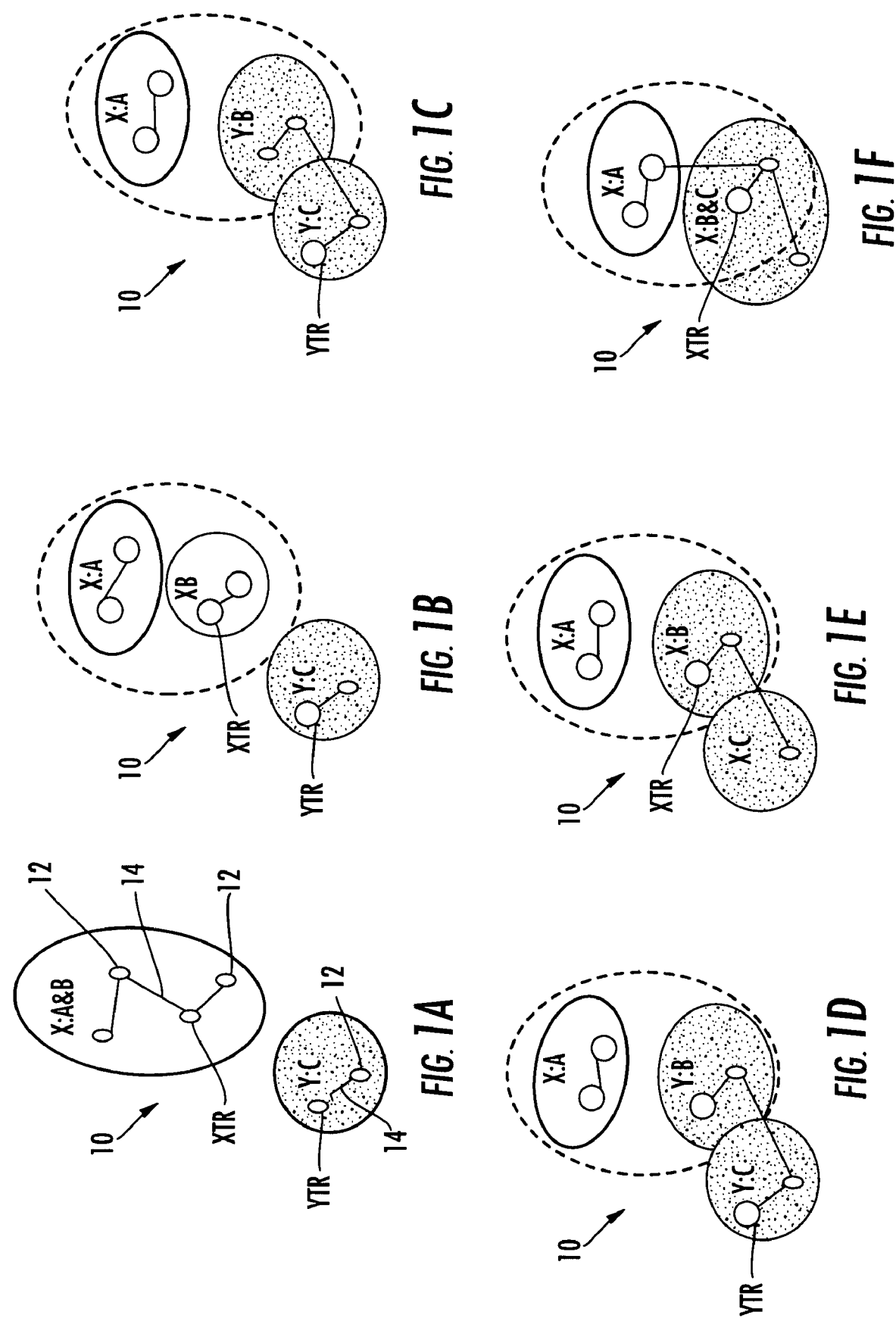

SYNCHRONIZATION AND TIMING SOURCE PRIORITY IN AN AD-HOC NETWORK

FIELD OF THE INVENTION

The present invention relates to the field of communications, and, more particularly, to wireless communications in ad-hoc networks and related methods.

BACKGROUND OF THE INVENTION

Wireless networks have experienced increased development in the past decade. One of the most rapidly developing areas is mobile ad-hoc networks. Physically, a mobile ad-hoc network includes a number of geographically-distributed, potentially mobile nodes sharing a common radio channel. Compared with other types of networks, such as cellular networks or satellite networks the most distinctive feature of mobile ad-hoc networks is the lack of any fixed infrastructure. The network may be formed of mobile nodes only, and a network is created "on the fly" as the nodes transmit with each other. The network does not depend on a particular node and dynamically adjusts as some nodes join or others leave the network.

The standards governing Wireless Local Area Networks (WLANs) networking products are defined by a suite of specifications issued by the IEEE and known as the IEEE 802.11 standard, incorporated herein by reference in their entirety. The standards define the operation of both the radio PHY layer and the MAC layer including a synchronization mechanism. The synchronization mechanism is used to provide a uniform time base.

For example, a timing synchronization function is operative to keep the timers of all the nodes in the same basic service set (BSS) synchronized. Each node maintains its own local timer. In a conventional WLAN infrastructure network, the access point is the timing master and is operative to implement the timing synchronization function. The access point periodically transmits special frames called beacons that contain a copy of its timing synchronization function timer. The beacons are used by the other nodes to synchronize to the access point. A node always accepts the timing information received in a beacon from the access point servicing its BSS. If the timer of a node is different from the timestamp in the received beacon, the receiving node sets its local timer to the received timestamp value.

For ad-hoc networks, the timing synchronization is typically implemented using a distributed algorithm that is performed by the member nodes. Each node transmits beacons in accordance with an algorithm defined in the 802.11 standard. Each node adopts the timing received from any beacon or probe response that has a timing synchronization function value later than its own timer. Nodes expect to receive beacons at a nominal rate. The interval between beacon transmissions is defined by beacon period parameter of the node. A node sending a beacon sets the value of the timestamp to be equal to the value of the timing synchronization function timer of the node at the time that the first bit of the timestamp is transmitted to the PHY plus the transmitting delays of the node through its local PHY from the MAC-PHY interface to its interface with the wireless medium (i.e. antenna, etc.).

Time Division Multiple Access (TDMA) based ad-hoc networks are prone to synchronization issues due to node movement, radio clock drifting, merging of groups of nodes with different timing references. A timing reference is the beginning time of a common frame. There are many other causes for network synchronization errors.

Various problems exist with correcting timing reference errors. For example, a node can broadcast a timing reference packet to correct the timing errors in the network. But it may take sometime or require continuous flooding of the timing reference information for the timing reference node to know about the error conditions.

Current approaches include flooding the network with a Timing Reference Packet (TRP) but bandwidth consumption is a concern. If the network maintains a network clock then the TRP uses a time stamp to represent the correct timing reference. For example, an 802.11 type of network keeps a common network clock. If there are unstable links, not every node could hear the single flooding of the timing reference packet, and flooding may have to be done multiple times, or periodically. The timing reference packet has to be sent periodically due to clock drifting. If a network clock is not maintained (identity of the timing reference but not the reference time is distributed) then the TRP may contain a unique packet ID, so that whichever node has received the TRP can derive the correct identification of the timing reference node. The timing reference node is notified if a synchronization error is detected or the TRP is periodically flooded. However, a timing reference ambiguity can persist for some time.

Another conventional approach is Ad-hoc Extensions to the 802.15.2 MAC Protocol (developed by Winlab, Rutgers university). The group uses 2 keys in a beacon. A key is similar to the group ID. It is used to indicate synchronization status and membership. Either one of the two can be used to identify the group. The two keys shared by all member nodes have different expiration time stamps. They will be regenerated and re-distributed to all members, if expired. If the group is separated longer than the key expiration period, the current keys circulated in each group will be different. When the sub-groups merge, they will go through the normally required re-synchronization process. However, it will be immediately evident to all nodes in each group that there are two timing reference nodes.

This approach can be complicated when the groups are merging at the same moment as the new keys are being generated and re-distributed in ether, or both groups. Another disadvantage of this approach is the bandwidth consumption by the two keys. In an HP-NET, a key of 20 to 30 bits would consume a significant amount of the bandwidth allocated by each node to network control tasks.

Many references relate to the synchronization of devices in hierarchical wireless networks, where one or several synchronized masters operate as timeservers. U.S. Patent Application Serial No. 20040190487, entitled "Method For Synchronizing A Control Channel To A Working Channel", filed on Mar. 31, 2003, for example, relates to a method for synchronizing a control channel to a working channel. Moreover, U.S. Pat. No. 6,792,247 relates to a method for synchronizing reception in wireless networks, in which a synchronization packet of a special format is transmitted before a data packet is transmitted. U.S. Pat. No. 6,785,253 and U.S. Pat. No. 6,622,022 also disclose methods for synchronizing hierarchical wireless networks wherein at least one node is selected as the central transfer node or as the main network node which is responsible for providing frame synchronization services. Moreover, U.S. Pat. No. 6,546,026 relates to a method for improving the time synchronization in wireless applications (e.g., TDMA).

Methods for synchronizing cellular wireless networks using GPS timing signals can also be found in U.S. Pat. No. 6,542,754 and U.S. Pat. No. 6,538,600. Moreover, U.S. Pat. No. 6,466,608 relates to a synchronization method that requires defining a hierarchical structure of the network, wherein the synchronization process is controlled by assigned master nodes. Moreover, U.S. Pat. No. 5,812,547 relates to a method for transmitting data packets in a wireless network, without dependence on fixed time slot or a central timing mechanism.

U.S. Pat. No. 6,594,273 relates to a method for communicating in an ad-hoc multihopping network, wherein the network includes active and passive terminals, and wherein only the active terminals participate in routing and synchronization. U.S. Pat. No. 6,807,165 and U.S. Pat. No. 5,699,388 present methods using a unique time source and propagating the synchronization in the network from upstream to downstream terminals. Moreover, U.S. Patent Application Serial No. 20040005902, entitled "System and method for correcting the clock drift and maintaining the synchronization of low quality clocks in wireless networks", filed Jul. 5, 2002, relates to a method that allows synchronization of terminals at any precision, using a reference clock that operates as a network master.

SUMMARY OF THE INVENTION

In view of the foregoing background, it is therefore an object of the present invention to provide a bandwidth efficient and robust timing synchronization capability in an ad-hoc network.

This and other objects, features, and advantages in accordance with the present invention are provided by a mobile ad-hoc network including at least one group of mobile nodes including at least one timing reference (TR) node. Each mobile node includes a controller and a wireless communications device cooperating therewith to generate and transmit timing synchronization beacons having a respective hop count indicating a number of hops to the at least one timing reference node, receive timing synchronization beacons from neighboring nodes, and synchronize node communication timing with neighboring nodes based upon the number of hops to the at least one timing reference node.

The at least one timing reference node may include a Global Positioning System (GPS) supported node. The controller and the wireless communications device may cooperate to periodically update the respective hop count and/or to synchronize node communication timing with the at least one timing reference node or with a neighboring node that is closer to the at least one timing reference node than itself. The beacons may include a respective group ID.

Furthermore, the at least one timing reference node may cooperate with the other mobile nodes based upon a timing source priority tree including levels defined by hop counts. The at least one timing reference node is at a starting level of the timing source priority tree. The other nodes are at a higher level of the timing source priority tree than the starting level and correspond to the number of hops to the at least one timing reference node. The controller and the wireless communications device may cooperate to synchronize node communication timing with lower level group nodes.

A method aspect is directed to a method of operating a group of mobile nodes within an ad-hoc network, the group including at least one timing reference (TR) node. The method includes each node of the group generating and transmitting timing synchronization beacons having a respective hop count indicating a number of hops to the at least one timing reference node, each node receiving timing synchronization beacons from neighboring nodes, and synchronizing node communication timing with neighboring nodes based upon the number of hops to the at least one timing reference node.

Each node may periodically update the respective hop count. Also, synchronizing may include synchronizing node communication timing with a neighboring node that is closer to the at least one timing reference node than itself. The at least one timing reference node may cooperate with other nodes based upon a timing source priority tree including levels defined by hop counts with the at least one timing reference node being at a starting level of the timing source priority tree, and the other mobile nodes being at higher levels of the timing source priority tree than the starting level and which correspond to the number of hops to the at least one timing reference node. Synchronizing may include synchronizing node communication timing of higher level group nodes with lower level group nodes.

BRIEF DESCRIPTION OF THE DRAWINGS

FIGS. 1A-1F are schematic diagrams illustrating a sequence of stages of a merger of two respectively synchronized groups of nodes in an ad-hoc network.

FIG. 22 is a schematic diagram illustrating a group of non-synchronized nodes in an ad-hoc network.

DETAILED DESCRIPTION OF THE PREFERRED EMBODIMENT

Figure 2A:
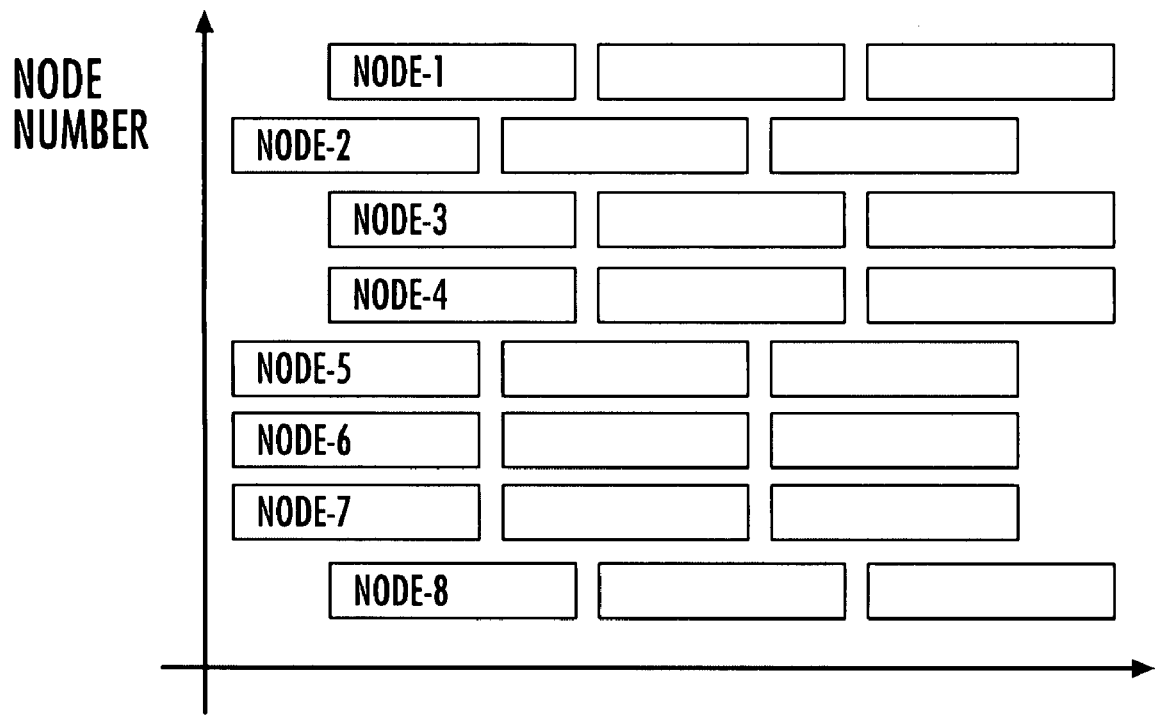
FIG. 2A is a schematic signal timing diagram illustrating TDMA frame numbers for nodes 1-8 of FIG. 3.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It is appreciated by one skilled in the art that the approach of the present invention is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Note that throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication;

and/or infrared (IR) short-range communication. Applications may involve point-to-point communication, point-to-multipoint communication, broadcasting, cellular networks and other wireless networks.

FIGS. 1A-1F are snapshots of an example network 10 of mobile nodes 12 currently operating as two internally synchronized groups or clusters (X:A&B; Y:C) and showing wireless links 14 connecting the nodes. The network 10 includes the plurality of mobile nodes 12, such as laptop computers, personal digital assistants (PDAs) or mobile phones, that are connected by wireless communication links 14 as would be appreciated by the skilled artisan. A link 14 is the basic connection in a network and is simply the physical link between any two nodes 12. Information describing the node includes a node ID (IP address, ATM address, etc) and positional information if available. Such a network could be a mobile ad-hoc wireless communications system. Such examples of networks are set forth in commonly assigned U.S. Pat. Nos. 6,763,013; 6,754,192; and U.S. Pat. Publication Nos. 2005/0053003 and 2004/0203820, the disclosures of which are incorporated by reference in their entirety.

In an ad hoc network, a cluster is a group of nodes that are topologically connected and share a membership in the group. The cluster could span 1-hop or multiple hops. The timing reference (TR) node of the cluster has certain specific functions that benefit the cluster. Any node may become the TR node and the TR's node ID may be used for the group ID with respect to at least timing synchronization issues. There may be one or more TR nodes in the group and a new TR node should be elected if the current TR node is powered down or leaves the network or group.

Figure 4:
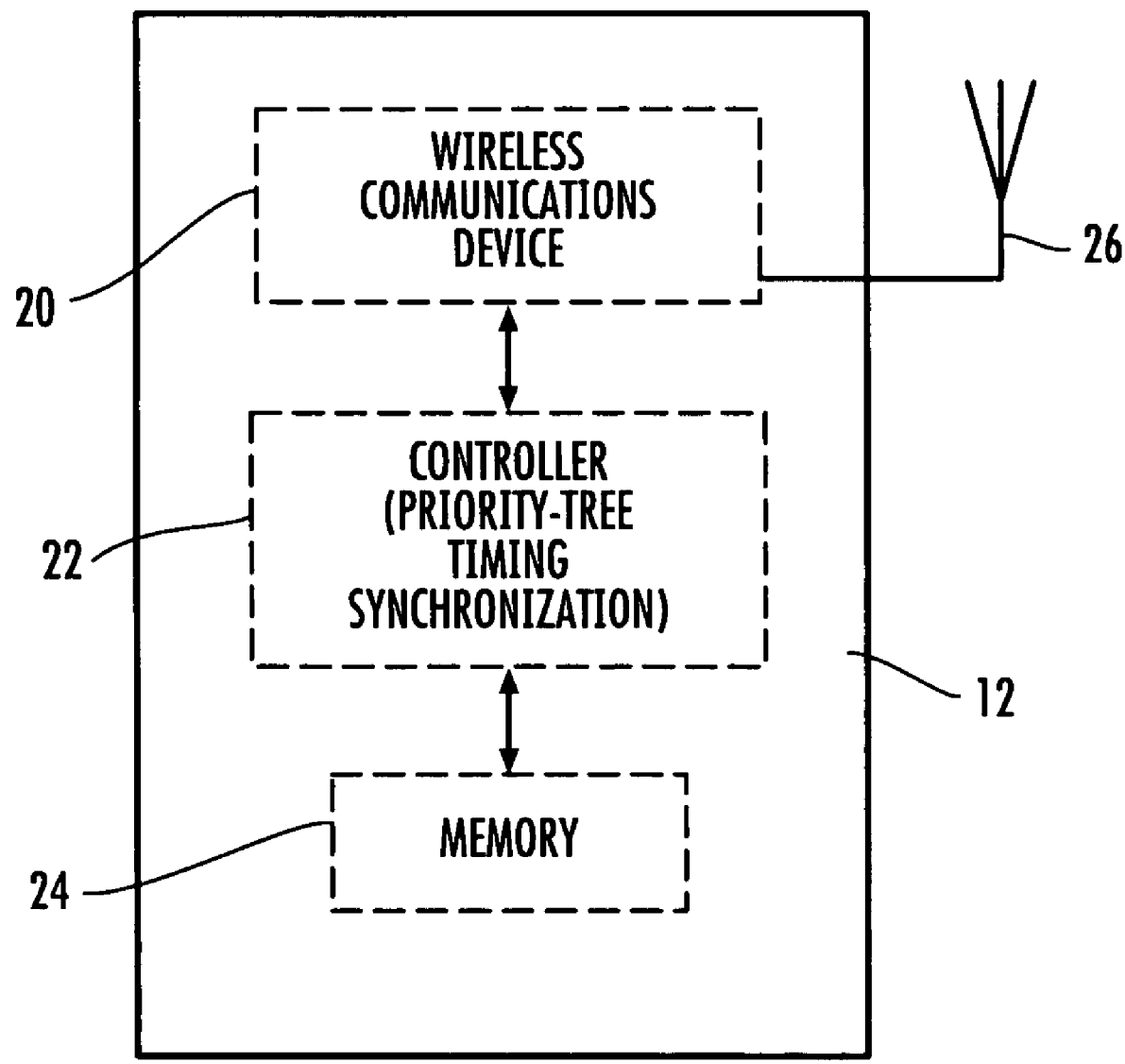
FIG. 4 is a schematic block diagram illustrating an example of a wireless node for use in the ad-hoc network of FIG. 3.

Referring more specifically to FIG. 4, the nodes 12 may be any suitable type of mobile device capable of communicating within a MANET, including a wireless communications device 20, for example, and other devices as are appreciated by those of skill in the art. Of course, it will also be appreciated that certain nodes 12 may optionally be connected to a fixed communication infrastructure in some applications, if desired.

The mobile nodes 12 further illustratively include a controller 22, the operation of which will be described below. By way of example, the controller 22 may be implemented using microprocessors, memory, software, etc., as will be appreciated by those of skill in the art. An associated memory 24 may also be included. Furthermore, the wireless communications device 20 may include wireless modems, wireless local area network (LAN) devices, cellular telephone devices, etc., as well as an associated antenna 26 or antennas, as illustratively shown. By way of example, one or more phased array antennas (as well as other suitable antennas) may be used, as will be appreciated by those skilled in the art.

Referring again to FIGS. 1A-1F, an example of a sequence of events that may cause a synchronization error will now be described. The groups X:A&B and Y:C are not synchronized with each other but are internally synchronized with respective TR nodes XTR and YTR (FIG. 1A). The two groups X:A&B and Y:C are about to merge. In FIG. 1B, group X is temporarily separated into X:A and X:B. Then, group X:B synchronizes with group Y:C and becomes group Y:B with YTR as the timing reference node as illustrated in FIG. 1C. In FIG. 1D, the timing reference node YTR becomes disabled and so timing synchronization is switched back to XTR (FIG. 1E) thereby creating group X:B&C with group X:A still believing that it is synchronized with the timing reference node XTR (FIG. 1F). As a result, the merged group X would be fragmented due to timing synchronization errors.

Figure 2B:
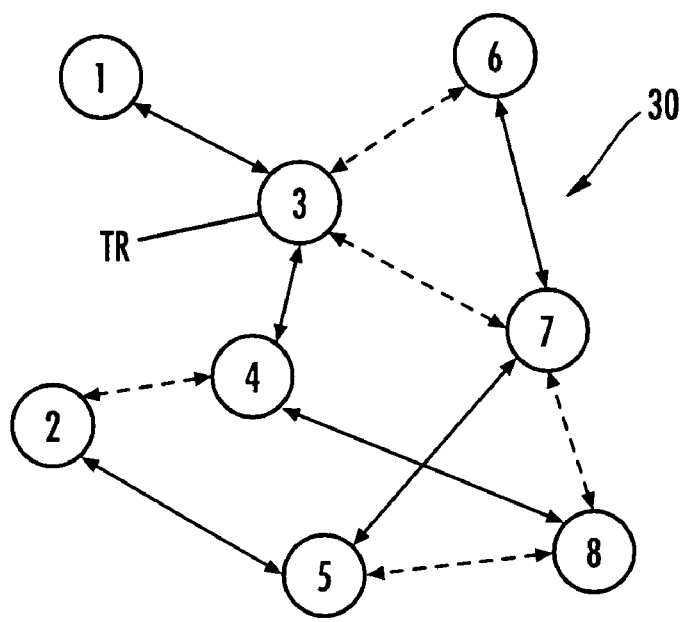

Referring now to FIGS. 2A and 2B, further details of s timing synchronization problem will be described. As illustrated in FIG. 2A, the TDMA frames of nodes 1, 3, 4 and 8 are not synchronized with the TDMA frames of nodes 2, 5, 6 and 7. In accordance with a conventional approach, if node 3 is the timing reference (TR) node of group 30, it may broadcast timing reference packets in an attempt to correct timing errors in the group or network. However, this approach may take sometime or require continuous flooding of the timing reference information. So, a more bandwidth efficient and timely approach to correct the synchronization error is needed.

The approach of the present invention provides a bandwidth efficient and robust timing synchronization capability in an ad-hoc network and will be described with reference to FIGS. 3 and 4. The mobile ad-hoc network includes at least one group 40 of mobile nodes 12 including at least one timing reference (TR) node. Each mobile node 12 includes a controller 22 and a wireless communications device 20 cooperating therewith to generate and transmit timing synchronization beacons having a respective hop count indicating a number of hops to the at least one timing reference node TR. The nodes 12 receive timing synchronization beacons from neighboring nodes, and synchronize node communication timing with neighboring nodes based upon the number of hops to the at least one timing reference node TR.

A beacon is a small condensed message that can be passed around and may include a node ID field and a parameter value field, e.g. indicating a number of hops to the TR node. The beacon may further include a group ID field defining a boundary for transmission of the beacon.

The at least one timing reference node TR may include a Global Positioning System (GPS) supported node. The controller 22 and the wireless communications device 20 may cooperate to periodically update the respective hop count and/or to synchronize node communication timing with the at least one timing reference node TR or with a neighboring node that is closer to the at least one timing reference node TR than itself.

Figure 3:
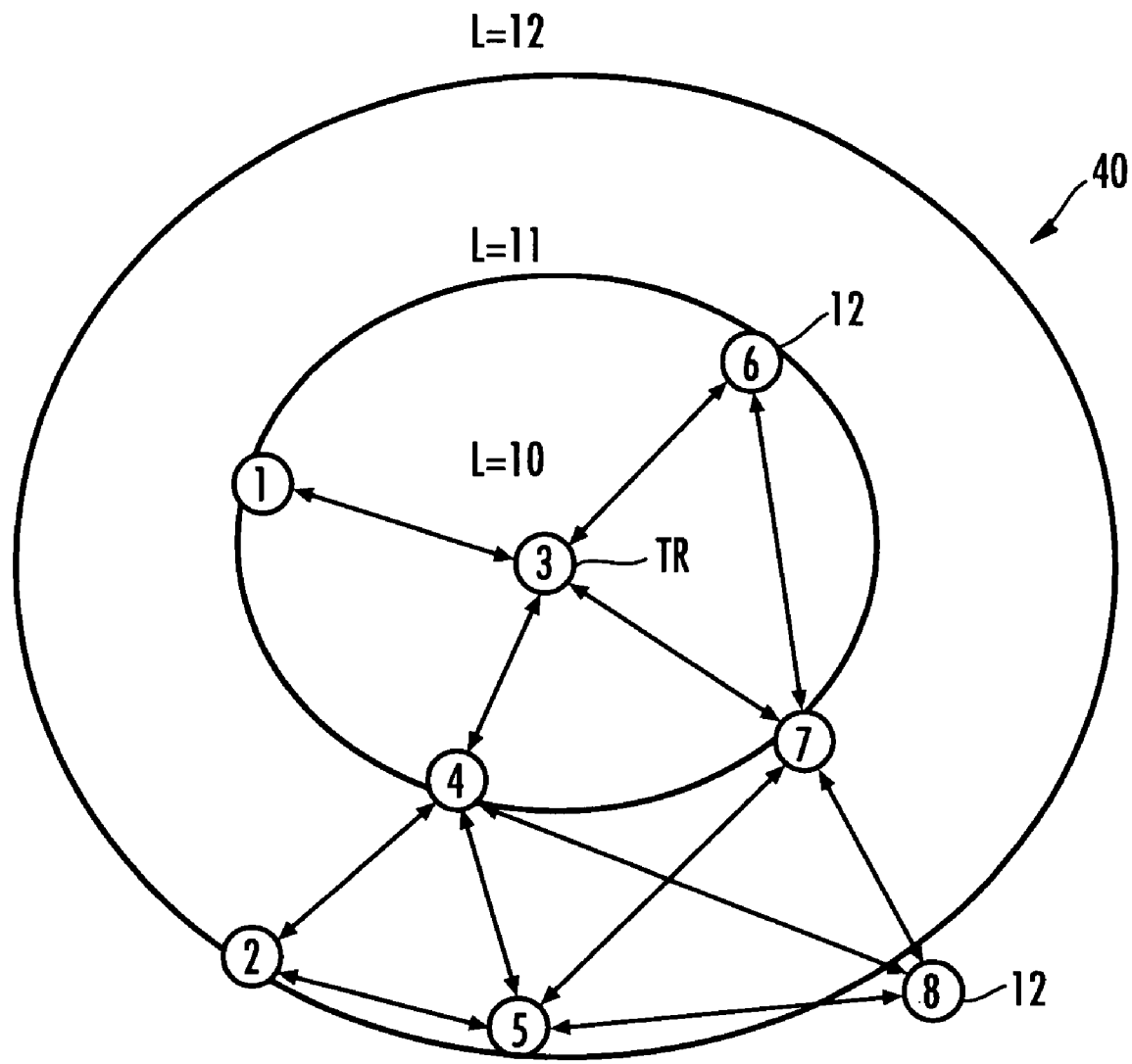
FIG. 3 is a schematic diagram illustrating a group of synchronized nodes in an ad-hoc network in accordance with the timing synchronization approach of the present invention.

Furthermore, the at least one timing reference node TR may cooperate with the other mobile nodes 12 based upon a timing source priority tree including levels (e.g. L=10, L=11 and L=12 as shown in FIG. 3) defined by hop counts. The at least one timing reference node TR is at a starting level (e.g. L=10) of the timing source priority tree. The other nodes 1, 4, 6, 7 (e.g. L=11) and nodes 2, 5 and 8 (e.g. L=12) are at a higher level of the timing source priority tree than the starting level and correspond to the number of hops to the at least one timing reference node TR. The controller 22 and the wireless communications device 20 of each node may cooperate to synchronize node communication timing with lower level group nodes.

A method aspect is directed to a method of operating a group 40 of mobile nodes 12 within an ad-hoc network, the group including at least one timing reference (TR) node. The method includes each node 12 of the group generating and transmitting timing synchronization beacons having a respective hop count indicating a number of hops to the at least one timing reference node TR, each node receiving timing synchronization beacons from neighboring nodes 12, and synchronizing node communication timing with neighboring nodes based upon the number of hops to the at least one timing reference node.

The timing synchronization approach of the present invention may be referred to as Timing Source Priority Dynamic Hop-count (TSDH) approach with each node advertising a Group ID and a hop count (TSDH) in its beacon. The timing reference (TR) node acts as the timing reference. A single TR node was elected, e.g. with a distributed algorithm. If there are nodes with GPS timing each GPS supported node can act as a TR node. The hop-count indicates how far away a particular node is from the TR and the TR becomes a root node with the other nodes being the children nodes hanging to the root node to define a tree structure. Multiple TSDH tree structures are possible if there are more than one GPS supported nodes.

GPS supported nodes may result in an automatic upgrade, e.g. the TR node (for GPS) may have a TSDH level L=0, while the TR node (for non-GPS) may have a TSDH level L=10. This feature may force the whole network to synchronize with GPS nodes. Re-synchronization is possible with the TSDH as if any part of the network develops a timing synchronization error, the direction of correcting the timing will be made towards the root node of TSDH tree. For TSDH tree maintenance there may be three simple rules: Rule 1 is that the root node's TSDH value will be unchanged over time, e.g. L=0 if GPS supported, and L=10 for a non-GPS TR node; Rule 2 is that other nodes periodically update their hop count; and Rule 3 is that a node's advertised TSDH max value is TSDH=min{neighbor−TSDH}+1. This creates tension between the root and the branches and leaves of the TSDH tree. In other words, at network edge, TSDH is trying to fly higher and higher, the root node pulls the chain straight. In the example of FIG. 3, node 3 is GPS based and the root of the TSDH tree. Node 2 (TSDH=2) has different timing with node 4 and node 5. Node 2 will synchronize with node 4 (TSDH=1), a parent node in the tree.

The approach of the present invention is bandwidth efficient because the hop-counts (TSDH) are automatically and dynamically updated due to node movement and topology change. No topology information packet/message is needed as the TSDH tree is automatically maintained, and in a distributed fashion. The approach is robust in ad-hoc network with unstable links. The TSDH value can be represented by a few bits.

Re-synchronization capability (e.g. course timing corrections) is more instant. The approach is distributed throughout a network. Automatic GPS support includes automatically synchronized to GPS timing. GPS-based node is given a minimum value, e.g. zero. Network timing tracking (e.g. small timing corrections) is addressed because when multiple GPS-based nodes exist in the network, then the clock drifting issue is mitigated. The network timing is being stabilized locally around any GPS nodes. Weighted timing correction can be achieved due to the sense of higher priority timing source being known locally among the neighbor nodes.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad-hoc network comprising:
at least one group of mobile nodes including at least one timing reference node;
each mobile node comprising a controller and a wireless communications device cooperating therewith to
generate and transmit timing synchronization beacons having a respective hop count indicating a number of hops to the at least one timing reference node,
receive timing synchronization beacons from neighboring nodes, and
synchronize node communication timing with neighboring nodes based upon the number of hops to the at least one timing reference node.

2. The mobile ad-hoc network according to claim 1 wherein the at least one timing reference node includes a Global Positioning System (GPS) supported node.

3. The mobile ad-hoc network according to claim 1 wherein the controller and the wireless communications device cooperate to periodically update the respective hop count.

4. The mobile ad-hoc network according to claim 1 wherein the controller and the wireless communications device cooperate to synchronize node communication timing with the at least one timing reference node or with a neighboring node that is closer to the at least one timing reference node than itself.

5. The mobile ad-hoc network according to claim 1 wherein the beacons include a respective group ID.

6. The mobile ad-hoc network according to claim 1 wherein the at least one timing reference node cooperates with the other mobile nodes based upon a timing source priority tree including levels defined by hop counts.

7. The mobile ad-hoc network according to claim 6 wherein the at least one timing reference node is at a starting level of the timing source priority tree.

8. The mobile ad-hoc network according to claim 7 wherein the other nodes are at a higher level of the timing source priority tree than the starting level and correspond to the number of hops to the at least one timing reference node.

9. The mobile ad-hoc network according to claim 8 wherein the controller and the wireless communications device cooperate to synchronize node communication timing with lower level group nodes.

10. A mobile node for operation in a group of mobile nodes within an ad-hoc network, the group including at least one timing reference (TR) node, the mobile node comprising:
a controller and a wireless communications device cooperating therewith to
generate and transmit timing synchronization beacons having a respective hop count indicating a number of hops to the at least one timing reference node,
receive timing synchronization beacons from neighboring nodes, and
synchronize node communication timing with neighboring nodes based upon the number of hops to the at least one timing reference node.

11. The mobile node according to claim 10 wherein the controller and the wireless communications device cooperate to periodically update the respective hop count.

12. The mobile node according to claim 10 wherein the controller and the wireless communications device cooperate to synchronize node communication timing with a neighboring node that is closer to the at least one timing reference node than itself.

13. The mobile node according to claim 10 wherein the beacons include a respective group ID.

14. The mobile node according to claim 10 wherein the at least one timing reference node cooperates with other nodes based upon a timing source priority tree including levels defined by hop counts; wherein the at least one timing reference node is at a starting level of the timing source priority tree; and wherein the mobile node is at a higher level of the timing source priority tree than the starting level and which corresponds to the number of hops to the at least one timing reference node.

15. The mobile node according to claim 14 wherein the controller and the wireless communications device cooperate to synchronize node communication timing with lower level group nodes.

16. A method of operating a group of mobile nodes within an ad-hoc network, the group including at least one timing reference (TR) node, the method comprising:
- each node of the group generating and transmitting timing synchronization beacons having a respective hop count indicating a number of hops to the at least one timing reference node;
- each node receiving timing synchronization beacons from neighboring nodes; and
- synchronizing node communication timing with neighboring nodes based upon the number of hops to the at least one timing reference node.

17. The method according to claim 16 further comprising each node periodically updating the respective hop count.

18. The method according to claim 16 wherein synchronizing comprises synchronizing node communication timing with a neighboring node that is closer to the at least one timing reference node than itself.

19. The method according to claim 16 wherein generating beacons includes generating beacons having a respective group ID.

20. The method according to claim 16 wherein the at least one timing reference node cooperates with other nodes based upon a timing source priority tree including levels defined by hop counts; wherein the at least one timing reference node is at a starting level of the timing source priority tree; and wherein the other mobile nodes are at higher levels of the timing source priority tree than the starting level and which correspond to the number of hops to the at least one timing reference node.

21. The method according to claim 20 wherein synchronizing comprises synchronizing node communication timing of higher level group nodes with lower level group nodes.

* * * * *